United States Patent [19]
Candel

[11] 3,768,788
[45] Oct. 30, 1973

[54] LIQUID AERATION METHOD AND APPARATUS

[76] Inventor: Sebastien M. Candel, 790 Earlhom, Pasadena, Calif. 91106

[22] Filed: Apr. 21, 1971

[21] Appl. No.: 136,102

[52] U.S. Cl. ............................... 261/122, 261/124
[51] Int. Cl. ............................................. B01f 3/04
[58] Field of Search ........................... 261/122, 124; 285/235

[56] References Cited
UNITED STATES PATENTS

| | | | |
|---|---|---|---|
| 3,048,339 | 8/1962 | Tapleshay | 261/122 |
| 3,525,436 | 8/1970 | Reckers | 261/124 |
| 3,532,272 | 10/1970 | Branton | 261/122 |
| 3,396,950 | 8/1968 | Wood | 261/124 |
| 3,317,087 | 5/1967 | Landis | 285/235 |
| 3,700,266 | 10/1972 | Glehn | 285/235 |

*Primary Examiner*—Tim R. Miles
*Assistant Examiner*—Steven H. Markowitz
*Attorney*—Christie, Parker & Hale

[57] ABSTRACT

A method for aerating a liquid such as sewage in a treatment tank, includes arranging a plurality of discrete diffusing surfaces in an optimum pattern about the tank and transmitting an identical quantity of air through each diffusing surface so that a plurality of discrete columns of air bubbles ascend through the liquid in an optimum pattern to the surface thereof. This pattern maximizes the rate of air/liquid interface production by increasing the mean velocity difference between air and liquid, and enhancing the degree of localized microturbulence. The residence time of the air bubbles is also increased. This results in a higher oxygenation efficiency. A diffusing apparatus is also disclosed for facilitating the above process. The apparatus includes a diffusing material having a substantially flat outer surface, and means for connecting the diffusing material in air flow communication with an air conduit disposed adjacent or under the bottom of the tank, such that the outer diffusing surface is substantially horizontal. A plurality of these diffusing apparati may be easily and quickly arranged about the tank in any desired pattern.

13 Claims, 8 Drawing Figures

Patented Oct. 30, 1973

INVENTOR.
SEBASTIAN M. CANDEL
BY
Christie, Parker & Hale
ATTORNEYS

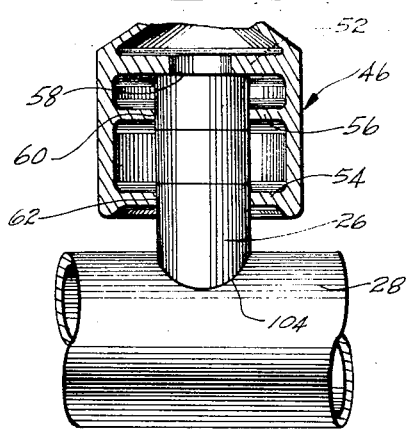 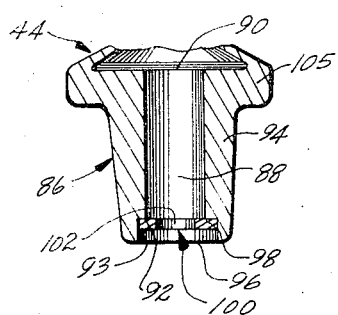 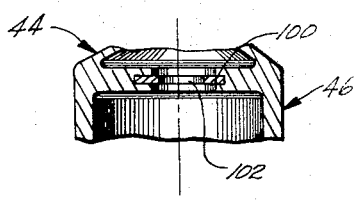 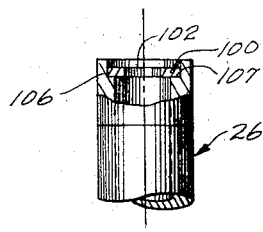 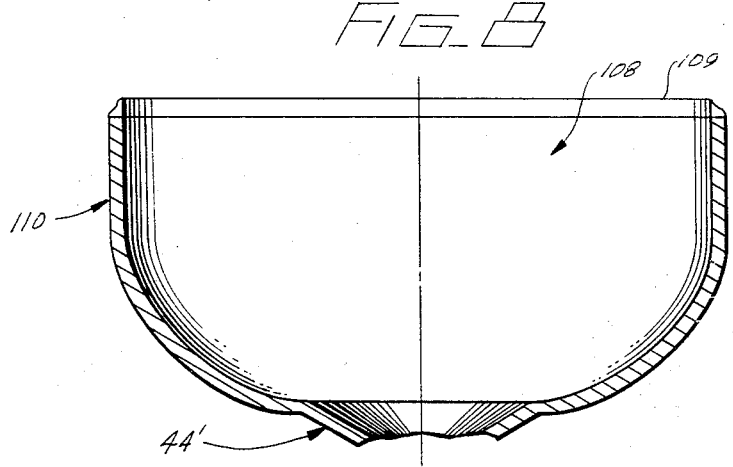

LIQUID AERATION METHOD AND APPARATUS

BACKGROUND OF THE INVENTION

This invention relates to the diffusion of air into a liquid and more particularly to a method and apparatus for aerating sewage during the course of sewage treatment.

A common form of sewage treatment is by the activated sludge process. In an initial stage of this process, raw sewage influent is mixed with settled solids or sludge and is aerated for a predetermined period of time. During this period, the raw sewage and sludge undergo a biochemical process where the solids, organic matter and bacterias are converted into liquids and activated sludge. More specifically, the solid matter in the sewage is absorbed and partly oxidized by masses of bacteria which form into clumps of solid matter, referred to as floc or activated sludge.

The liquid/floc suspension is then commonly fed to a clarifier where the sludge flocs settle out and are eventuallly partly remixed with the incoming raw sewage. Meanwhile, the liquid remaining in the clarifier is discharged as purified effluent. Such effluent may be fed through a chlorinator for further purification.

Aeration for the activated sludge process is generally provided by bubbling in compressed air through a diffusing device situated in a treatment tank. However, aeration may also occur by mechanically stirring the water to bring it in contact with ambient air. This invention is concerned with the former method of aeration.

In the past, various methods of aeration by compressed air have been used. In one such method air is introduced through porous tubes located adjacent a side wall of the tank. The rising air bubbles impart an overall rotary motion to the sewage. This method (so-called "spiral flow") has proven least efficient in aerating sewage. The large scale rotary motion of the sewage swiftly entrains the bubbles to the surface, thus decreasing the residence time of each air bubble in the liquid.

Most of the energy available from the expanding air bubbles is converted into mean flow kinetic energy and further dissipated by the friction forces at the walls. Most of the energy is thus dissipated far from the diffusion region; the degree of turbulence in this region is small resulting in a reduced rate of interface production and thus reduced oxygenation efficiency.

The mean velocity difference between the air bubbles and the liquid is also minimal, further decreasing the rate of interface production. Additionally, a core of poorly aerated sewage develops in the center of the tank. As used in this application, the terms "rate of interface production" or the "rate of interface renewal" are both defined as the rate at which the liquid sewage/air interface is renewed with new monomolecular layers of low oxygenated sewage.

The porous tubes used in the "spiral flow" method have a number of defects. For instances, only 30 percent of their surface is effective for producing air bubbles because of the pressure difference between the upper and lower part of the tube. The mechanical mounting of the tubes is expensive and is subject to corrosion by the highly corrosive sewage. Additionally, to avoid clogging the diffusing material, the air must be carefully filtered.

In another method of diffusing air into a liquid, such as sewage, air is diffused through porous plates built into the base of the tank. To avoid clogging, the air must be carefully filtered. Clogging also occurs when the air flow breaks down. After a period of time, the bottom of the tank must be rebuilt resulting in a high maintenance cost. As the plates have to resist high mechanical stresses (especially when an air breakdown occurs) they are relatively thick. This results in higher pressure losses and thus higher energy comsumption.

At present, all the methods of diffusing air into sewage have one or more of the following disadvantages: high initial cost, complex construction, difficult maintenance, great energy comsumption, low oxygenation efficiency.

SUMMARY OF THE INVENTION

A critical evaluation of existing aeration systems has uncovered fundamental design misconceptions. A detailed analysis of the physics and fluid mechanics of the aeration process was conducted. (It is based on such studies that the spiral flow method was found so deficient).

In terms of the physics of diffusion, it was learned that maximum oxygenation efficiency is obtainable only when a large deficiency exists between the oxygen concentration in the monomolecular layer of the water immediately adjacent an air bubble before it contacts the air bubble to form an interface. At the instant the interface is formed, the monomolecular layer becomes saturated with oxygen. It is necessary to constantly and as rapidly as possible renew this interface with new monomolecular layers of low concentration, i.e. the rate of interface production should be at a maximum.

From a consideration of fluid mechanics, it was discerned that the rate of interface production is maximized when the velocity differential between the air bubbles and the liquid adjacent thereto and being entrained thereby is maximized. This may result from a higher mean velocity difference and also a higher degree of microturbulence near the region of oxygen transfer. The localized turbulence generates substantial eddy currents which transport liquid across the streamlines thereby further increasing the rate of interface renewal.

It was also discerned that the greater oxygenation rate will occur for maximum residence time of the bubbles in the liquid. Thus, the air bubbles should be allowed to rise naturally and not be rapidly entrained to the surface by an overall liquid flow as in the spiral flow method above described. Ideally, no overall liquid motion should exist, but rather the localized turbulence should be maximized especially near the diffusion regions.

The only source of energy in the system considered comes from the isothermal expansion of the gas bubbles as they rise to the surface. It is this energy which produces the fluid flow in the tank. The character of this motion is essentially determined by the distribution of this energy in the tank. When the gas is introduced in a small region of the tank, i.e. when the energy is released in a small region as in the spiral flow method, the liquid is set in a rapid motion, most of the energy is dissipated at the walls, and only a small amount is converted into turbulent energy in the bubbly region. The rate of interface production is poor. The mean motion entrains the bubbles to the surface thereby reducing their residence time.

If, on the other hand, the available energy is released uniformly in the tank, most of this energy will be converted into turbulent energy. No large scale mean motion will be produced. This results in a higher rate of interface production and a longer residence time.

It was, therefore, concluded from the above study that an efficient manner of diffusing air into a liquid, such as sewage, is a process whereby a plurality of discrete diffusing surfaces are arranged at the bottom of the tank in a regular pattern and air is transmitted through each diffuser to generate a plurality of discrete columns of ascending air bubbles.

Each air column entrains the adjacent liquid toward the surface. Return liquid currents flowing back down the tank, set up an area in the liquid surrounding the rising bubbles of substantially zero velocity. This area is like a cylindrical wall surrounding the column and is hereinafter referred to as the "zero velocity wall".

The difference between the liquid velocity at the "zero velocity wall" and the liquid velocity adjacent the bubbles sets up viscous shearing stresses which act to slow down the liquid being entrained by the bubbles, thereby increasing the velocity difference between the air bubbles and the liquid being entrained and thus the rate of interface production.

A discrete bubble column pattern is necessary to set up descending currents around the columns and to stabilize the general liquid circulation in the tank. Use of large diffusing surfaces is undesirable since no control would exist over the liquid flow pattern.

In accordance with the process of this invention, the available energy is spread uniformly in the tank so that no large scale mean motion will be created and so that the degree of turbulence will be enhanced. This also prevents the formation of a core of poorly aerated liquid in the center of the tank.

An optimum distribution of the diffusing surfaces exists and depends on the geometry of the tank, the system operating parameters, and the sewage quality. The optimum distribution may be determined analytically or, more accurately, by a trial and error process of diffuser arrangement and rearrangement in a prototype tank or in the full size tank. The best distribution maximizes the oxygenation efficiency.

The present invention is also directed to an apparatus for facilitating the above process and arrangement. Generally speaking, the apparatus comprises a diffusing material having a flat outer diffusing surface and means for connecting the diffusing material in air flow communication with an air inlet conduit situated adjacent or under the tank bottom, such that the outer diffusing surface is substantially horizontal. A plurality of these diffusing apparati may be arranged in any desired pattern about the tank.

An important feature of the apparatus of this invention is its easy mounting and dismounting on the air supply conduits, so that a trial and error process may be carried out to achieve maximum oxygenation efficiency. The apparatus is further important in that it is extremely low in cost and may be discarded when clogged. This feature eliminates the need for air filters and the like. It also eliminates air breakdown problems, i.e. when the air flow drops the liquid may enter the porous material and air supply pipes. Additionally, there is no restarting problem.

The apparatus is further characterized in having a simple, non-metallic and non-corrosive structure with no moving parts. It is thus quite well suited for use in a tank filled with highly corrosive oxygenated sewage.

In another aspect of the apparatus of this invention, the diffusing material is made relatively thin since it is small in outer surface area so that it is subject to relatively small mechanical stresses. Making the diffusing material thin reduces the initial cost thereof, decreases resulting pressure losses and thereby reduces the overall operating expenses and costs.

BRIEF DESCRIPTION OF THE DRAWING

These and other aspects and advantages of this invention are more clearly described with reference to the drawing wherein:

FIG. 4 shows how the apparatus in FIG. 3 is connected to an air inlet conduit;

FIG. 5 shows an alternative base portion for the apparatus of FIG. 3;

FIG. 6 shows a flow control disc embedded into the body of the apparatus of FIG. 3;

FIG. 7 shows a flow control disc formed in the air inlet conduit shown in FIG. 4; and FIG. 8 is a sectional view of a segment of an alternative diffusing apparatus of this invention.

DESCRIPTION OF THE PREFERRED EMBODIMENTS

Figure 1:
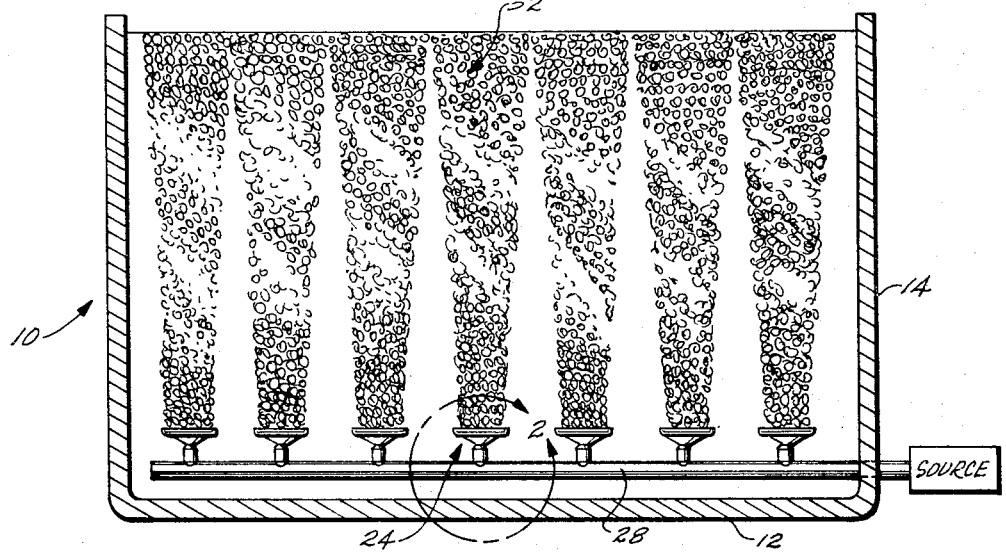
FIG. 1 is a cross-sectional view of a sewage treatment tank containing an array of diffusing apparati of this invention.

A sewage treatment tank 10 having a flat floor 12, side walls 14 and being of rectangular-shaped cross-section is shown in FIG. 1 as an example of one type of use for the process and apparatus of this invention. Since the precise geometrics of the tank may vary dependent upon design and economic considerations, it is important that whichever sewage treatment process and apparatus is used, it be made adaptable to any particular tank geometry employed. As shall be discussed hereinafter, such is the case with the process and apparatus of this invention. Tank 10 is designed and equipped to carry out a basic activated sludge process on liquid sewage contained therein.

An essential aspect of this process is the provision of an efficient aeration apparatus. From what has been discussed above, it was discerned that for the most efficient oxygenation of liquid sewage, a plurality of discrete diffusing surfaces, such as defined on a plurality of diffusers 24, should be arranged about the tank bottom to produce an array of ascending columns of air bubbles. Through a trial and error process, to be described below, an optimum arrangement for any particular tank geometry is discerned by measuring the oxygenation efficiency differential between the air bubbles of each column and the liquid being entrained toward the surface by the air bubbles.

Figure 2:
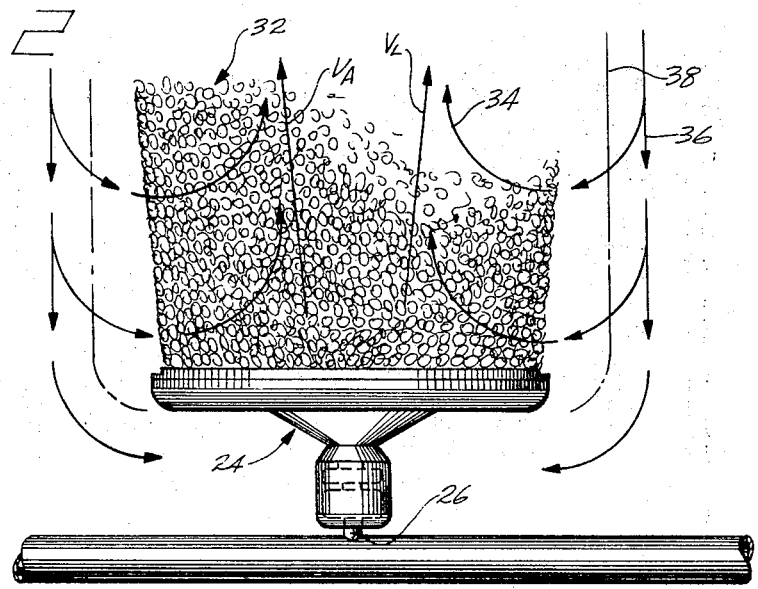
FIG. 2 is a blown-up view of one discrete diffuser showing the mean liquid flow paths and currents thereabout which form the theoretical basis of this invention.

As shown in FIGS. 1 and 2, diffusers 24 are arranged uniformly about the tank bottom in a series of rows and columns. Each diffuser is connected to a riser pipe 26 extending vertically upward from an air inlet manifold 28. A source 30 of compressed air is located without the tank and is connected to manifold 28 for supplying an identical quantity of compressed air to each of diffusers 24. Each diffuser 24 then generates an ascending column of isothermally expanding air bubbles 32.

As best shown in FIG. 2, air bubble column 32 rises toward the liquid surface at a velocity $V_A$. The rising column sets up a plurality of ascending and descending liquid currents, the ascending liquid currents 34 having a velocity $V_L$. Maximum oxygenation by maximum interface production requires a maximum velocity differential between $V_A$ and $V_L$. This occurs essentially automatically once an optimum arrangement of diffusers is discerned and made. More specifically, the descending liquid currents 36 interact with the adjacent ascending liquid currents 34 to set up a "zero velocity wall" 38 surrounding the bubble column. This, in turn, produces viscous shear stresses which act to slow down the liquid being entrained upwardly by the air bubbles thereby lowering the value of $V_L$ relative to $V_A$.

Oxygenation efficiency is further increased and maximized, due to an optimum arrangement of diffusers 24, since most of the energy emitted, as the bubbles rise and expand isothermally, is transferred into localized turbulent energy. Very little energy is lost due to friction forces at side wall 14 since there is no overall liquid flow. The absence of such overall liquid flow permits the air bubbles to rise naturally toward the surface so that their residence time within the liquid is maximized. Furthermore, the high degree of localized turbulence enhances the eddy current flow across the liquid streamlines. These three factors increase the oxygenation efficiency.

An optimum arrangement of diffusers 24 exists for every tank geometry, operational parameters, and liquid influent conditions. An important aspect of this invention is the ability to readily arrange the diffusers, consistent with the structure of conduit 28, in any desired pattern to achieve required bubble column patterns. More specifically, and as shall be described in greater detail below, each diffuser is readily removable from and replaceable on any of risers 26. There are generally many more risers defined on manifold 28 than is necessary so that arrangement and numerous re-arrangement of diffusers 24 may be undertaken to discern, by trial and error, the optimum liquid flow patterns.

Figure 3:
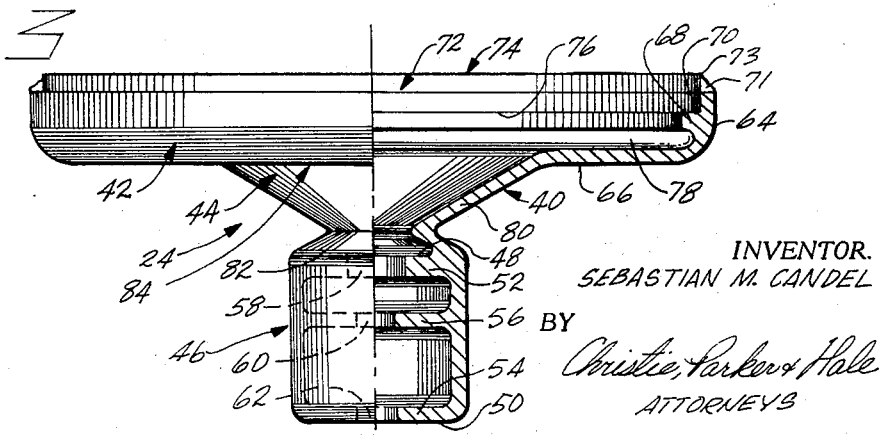
FIG. 3 is a side elevation view, partly in section, of a discrete diffusing apparatus in accordance with this invention.

Referring now to a particular diffuser 24, reference is had to FIGS. 2-4. Diffuser 24 is of unitary construction which is defined by a body 40. Body 40 is made of any cheap resinous material able to resist the surrounding medium, such as rubber or polyvinylchloride (PVC). For purposes of explanation, body 40 is divided into three basic parts: (1) a head 42, (2) a neck 44, and (3) a base 46.

Referring first to base 46 and to FIGS. 3 and 4, it can be seen that the base is used to fasten diffuser 24 to a selected one of riser pipes 26 on conduit 28. As shall be discussed below, base 46 insures that the diffuser is vertically stabilized relative to the tank bottom so that the diffusing surface, through which compressed air is passed, is substantially horizontal.

Base 46 is a hollow circular cylinder of diameter substantially larger than the diameter of riser pipe 26. The base has opposite ends 48 and 50 which are closed by a pair of disc-like membranes 52 and 54. Another membrane 56, similar in configuration to membrane 54, is disposed within base 46, parallel to membrane 52 and 54, and located intermediate membranes 52 and 54.

Each of membranes 52, 54 and 56 has a central aperture (58, 60 and 62, respectively) defined therethrough. Apertures 58, 60 and 62 are aligned with each other and are concentric with the longitudinal axis of the base. Each membrane is made of the same material as body 40. However, membranes 54 and 56 are made thinner than membrane 52 so that they are more elastic. In fact, membrane 52 is fabricated so that it is essentially rigid.

Apertures 60 and 62 are designed to receive riser pipe 26 as the base is pushed down thereover. In this regard, apertures 60 and 62 are preferably of smaller diameter than that of pipe 26. The elastic nature of membranes 54 and 56 permits apertures 62 and 60, respectively, to expand diametrically to receive riser pipe 26. Additionally, as the base is pushed down over riser pipe 26, membranes 54 and 56 tend to deform upwardly as their apertures open to receive the pipe. This is important for it makes vertical shifting of the diffuser in an upward direction difficult when the diffuser is mounted on the riser.

The purpose of membrane 52 is two-fold: (1) its aperture 58 provides air flow communication between base 46 and neck 44, and (2) it establishes a limit beyond which base 46 may no longer be pushed down on riser pipe 26. In the latter regard, as riser pipe 26 is inserted within base 46 through apertures 62 and 60 of membranes 54 and 56 as the base is pushed down, downward travel of the base will be stopped when the upper end of the riser pipe contacts relatively stiff upper membrane 52.

When this downward limit is reached, riser pipe 26 is in air flow communication with aperture 58 which has a smaller diameter than that of riser pipe 26. Membrane 52 is important in that it serves to stabilize diffuser 24 not only vertically, as above described, but angularly as well. More specifically, the open upper end of riser pipe 26 lies in a plane which, when in contact with the plane of upper membrane 52, prevents tipping of the diffuser relative to the riser pipe. Horizontal movement of diffuser 24 relative to riser 26 is stayed because of the gripping action of membranes 54 and 56 about the pipe. As shall become clearer below, when riser pipe is positioned as shown in FIG. 4, the flat diffusing surface defined on the diffuser is positioned substantially horizontal.

Reference is had to head 42 of diffuser body 40 which is now described with reference to FIGS. 2 and 3. Basically, head 42 is dish-shaped with a vertical annular outside wall 64 and a flat lower annular floor 66. Floor 66 extends from an inner diameter at the upper extent of neck 44 to an outer diameter at side wall 64. The junction of side wall 64 and floor 66 is smooth.

An annular lip 68 extends inwardly from said wall 64 to define a flat shelf 70 onto which a diffusing material 72 is to rest. The material may then be glued to head 42 by applying glue 71 about a peripheral edge 73 of the material so that the glue also contacts the top of side wall 64.

Referring now more specifically to material 72, it is preferably porous in nature and is defined as a circular disc of predetermined thickness. It may be made of any porous material, such as ceramics, for example. Material 72 has an upper flat diffusing surface 74 and a lower flat diffusing surface 76 parallel with surface 74. The outer periphery of lower surface 76 is designed to rest on annular shelf 70. As will be described below with reference to FIG. 8, use of a cellular diffusing material is also comtemplated in this invention.

Material 72 is made as thin as possible and yet still withstand the mechanical stresses built up in a liquid filled tank. Thus cuts down the initial cost of the diffuser. Additionally, having a relatively thin diffusing material cuts down the air pressure losses therethrough and thus the energy consumption. Such thin diffusing material is thus much more efficient in oxygenating the liquid than those prior art methods using thick porous ceramic plates at the tank bottom.

An air distribution space 78 is defined directly beneath material 72 and is peripheral bounded by lip 68. The lower part of space 78 communicates with neck 44 so that air transmitted through the neck may be uniformly distributed about lower surface 76 of material 72. An even and uniformly arranged column of air bubbles will thereby be generated from diffusing surface 74 as air passes through the pores of diffusing material 72.

Reference is now had to neck 44. Functionally speaking, neck 44 is a shock absorbing and vibration damping member. The walls 80 of neck 44 are defined as part of the unitary body 40 which is made of rubber or PVC. Walls 80 are somewhat thinner, so as to provide for a slightly greater elasticity, and are shaped like two truncated cones joined at their smaller bases. A large base 82 of one cone is connected to upper membrane 52 of base 46; whereas a large base 84 of the other cone supports head 42. Base 84 is of substantially greater diameter than base 82.

The slight elastic nature of neck 44 permits temporary and limited horizontal and vertical deformations thereof so as to absorb shocks and to damp vibrations caused by air diffusing through material 72.

In operation, and with reference to FIGS. 1–4, a plurality of diffusers 24 are assembled for use in tank 10. An initial arrangement of these diffusers along the tank bottom is made by mounting various ones of the diffusers on certain riser pipes 26. Each diffuser is mounted by grasping base 46 and pushing down on it until the riser pipe travels through apertures 60 and 62 of membrane 56 and 54 and eventually butts up against membrane 52. The diffuser is then properly vertically and horizontally positioned and stabilized so that diffusing surface 74 of material 72 is disposed substantially parallel to the liquid surface.

When the initial arrangement is made, compressed air is fed from the source through manifold 28 to each of the riser pipes. Those riser pipes not connected to a diffuser may be plugged so as not to interfere with the air bubble and liquid flow pattern generated in the tank.

With regard to a specific diffuser 24 connected to a specific riser pipe 26, air is transmitted through the pipe and into the interior of neck 44 through aperture 58 in membrane 52. The air then proceeds into distribution space 78 where it is uniformly distributed about lower surface 76 of material 72. The air then passes through the pores in material 72 and then out into the liquid through diffusing surface 74. Since surface 74 is flat and parallel to the tank bottom, a uniform ascending column of air bubbles 32 is generated.

From a study of the liquid flow and air bubble patterns generated, it might be desirable to change the arrangement of diffusers and/or add more or subtract some. It is thus an important aspect of this invention which enables a person to do this quickly and efficiently. Each diffuser is readily removable from a riser by pulling up on base 46. It may then be replaced on another riser or not used at all.

Eventually, an optimum arrangement of diffusers 24 about tank bottom 12 is made. This arrangement will produce a high rate of interface renewal. In the optimum arrangement, most of the energy generated, as the air bubbles of each column rise and expand isothermally, is transferred to localized turbulence and is not lost by friction forces at side walls 14. Thus, the bubble residence time is maximized as are the eddy currents flowing across the liquid streamlines. All of these factors contribute to a high rate of oxygenation.

An important aspect of this invention is the ability to discard any diffuser that has become clogged and to replace it with a new one. The extremely low cost of the diffuser permits such discarding. Since the diffuser may be thrown away, the quality of air flow is not important. Therefore, no costly air filtration devices are needed.

Another advantage of this invention is that there is no air breakdown problem. More specifically, liquid entering diffuser 24 through the pores in material 72 due to a drop in air pressure may be easily forced out when the air pressure is brought back to normal. There is no restarting problem when a thin porous diffusing surface is used.

An alternative base portion of a diffuser of this invention is shown in FIG. 5 and is designated generally by the reference numeral 86. Base 86 is similar to base 46 in that it forms part of an overall diffuser body which is fabricated of rubber or PVC. The interior of base 86 is in the form of a circular cylindrical bore 88 having an open upper end 90 defined at the lower extremity of the interior of neck 44 and an open lower end 92. An annular notch 93 is cut into a side wall 94 of base 86 beneath lower end 92. The notch extends downwardly to an open lower end 96 of base 86. An annular shelf 98 is thus defined in side wall 94 just beneath bore 88.

A flat, rigid, disc-like membrane 100, which is preferably fabricated of metal or plastic, is disposed against shelf 98 and is affixed thereto such as by glueing or the like. Membrane 100 has a central aperture 102 of lesser diameter than that of bore 88. The purpose of membrane 100 is to control the flow of air through the diffuser.

Base 86 differs from base 46 of diffuser 24 in that it is designed to be pushed into a hole 104 in manifold 28, which is shown in FIG. 4 as accommodating a riser pipe 26. When base 86 is used on a diffuser, a riser pipe is not needed. The base is essentially a plug thereby enabling the diffuser to be readily plugged in and out of manifold 28 through hole 104. The lower limit of travel of base 86 into hole 104 is defined when an annular flange 105 of the base contacts an outer surface of the manifold.

Flow control ring 100 may also be employed in the system of FIGS. 1–4 wherein a riser pipe is used to connect the diffuser to manifold 28. More specifically, ring 100 may be disposed within membrane 52 of base 46 in the manner shown in FIG. 6; or it might be disposed at the upper end of riser pipe 26 by being fixed to an annular shelf 107 notched into a side wall 106 of the pipe at such upper end (see FIG. 7). Wherever it is used, ring 100 controls the air flow through its constricted opening 102.

As indicated above, cellular diffusion materials are within the contemplation of this invention. A diffuser using a cellular diffusion material would have a base 46 and neck 44 identical to that of diffuser 24. The head, however, would differ. More specifically, and with reference to FIG. 8, a cellular diffusion material 108, such as polyurethane with open cells, is shown. For a good diffusion, the polyurethane foam has to be much thicker than porous ceramic plates, such as material 72. Additionally, since the adequate foam permits horizontal movement of air, a distribution space, such as space 78, need not be designed into the head.

With the above in mind, a head 110, for carrying a polyurethane diffusing material, has the shape of a reverse dome. Cellular polyurethane 108 completely fills the interior space of the dome and has a flat circular outer diffusing surface 109 which, when the diffuser is mounted to manifold 28, is parallel to the floor of tank 10. Material 108 may be affixed to the dome by being glued about its upper periphery to the upper edge of the dome side wall in a manner similar to the affixation of material 72 to side wall 64 of head 42. Glueing can be eliminated by fabricating the upper edge of the dome side wall with an inwardly extending annular flange (not shown) to serve as a lid on the foam.

In operation, air enters head 110 through the interior of a neck 44' and is automatically uniformly distributed through the polyurethane foam, since the latter is cellular. The air is then passed through the foam and is generated out from surface 109 into the adjacent liquid as an ascending air bubble column of the type required by this invention for maximum interface production.

What has been described, therefore, is a method and apparatus for increasing oxygenation in a sewage treatment tank by providing a high rate of interface production. Among the factors contributing to such high rate are: (1) maximum velocity difference between the rising air bubbles and the liquid being entrained thereby, (2) natural flow of air bubbles to the liquid surface, and (3) large number of eddy currents across the liquid streamlines occasioned by localized turbulence. The factors are realized in the method and apparatus of this invention.

Although the present invention has been described with regard to the specific embodiments disclosed, it is obvious that numerous modifications, additions and changes may be made thereto without departing from the spirit of the invention as defined in the following claims.

I claim:

1. Apparatus for diffusing air into a liquid through a conduit, the conduit having receiving means adapted to receive the apparatus in air flow communication, the apparatus comprising:
   a. a diffusing material having a substantially flat outer diffusing surface; and
   b. means for connecting the diffusing material in air flow communication with the receiving means of the conduit such that the outer diffusing surface is substantially horizontal, the connecting means including:
      i. means supporting the diffusing material;
      ii. means for securing the apparatus directly to the conduit receiving means and including an air flow passage therethrough for communicating air from the conduit through the passage; and
      iii. means joining the supporting means to the securing means for absorbing shocks and damping vibrations felt by the diffusing material, the interior of the joining means defining an air flow passage for establishing air communication between the air flow passage of the securing means and the diffusing material, said joining means including a first truncated conical section and a second truncated conical section, the two sections being joined at their smaller diameter ends to form a reduced diameter neck between the diffusing material and the securing means, the walls of said first and second section being of thin relatively flexible material to permit the diffusing material to tilt and move relative to the securing means.

2. The apparatus of claim 1, wherein the connecting means is fabricated of a non-corrosive material.

3. The apparatus of claim 1, further comprising an air distribution chamber communicating between an inner surface of the diffusing material and the interior of the joining means, the chamber acting to distribute air uniformly about the inner surface of the diffusing material so that it is diffused uniformly therethrough.

4. The apparatus of claim 1, wherein the diffusing material is porous in nature.

5. The apparatus of claim 1, wherein the diffusing material is cellular in nature.

6. The apparatus of claim 1, wherein the connecting means is fabricated of a resinous material.

7. The diffuser of claim 1, wherein the receiving means of the conduit includes an aperture defined through the outer surface of the conduit and the securing means comprises:
   a. an elongate plug having an outer housing in which is disposed an inner chamber communicating between a pair of open opposite ends, the securing means air flow passage being defined through the chamber between the open opposite ends; and
   b. flow control means disposed within the chamber adjacent one end thereof and closing such end but for an opening disposed therethrough, the opening having an effective area less than the cross-sectional area of the chamber.

8. The diffuser of claim 7, wherein the elongate plug housing has an outwardly extending annular flange adjacent the other end of the chamber.

9. The diffuser of claim 8, wherein the elongate plug housing is tapered from a maximum cross-sectional area adjacent the annular flange, to a minimum cross-sectional area adjacent the one end of the chamber.

10. Apparatus for diffusing air into a liquid through a conduit, the conduit having receiving means adapted to receive the apparatus in air flow communication, the apparatus comprising:
   a. a diffusing material having a substantially flat outer diffusing surface; and
   b. means for connecting the diffusing material in air flow communication with the receiving means of the conduit such that the outer diffusing surface is substantially horizontal, the connecting means including:
      i. means supporting the diffusing material;
      ii. means for securing the apparatus directly to the conduit receiving means and including an air flow passage therethrough for communicating air from the conduit through the passage; and iii. means joining the supporting means to the securing means for absorbing shocks and damping vibrations felt by the diffusing material, the interior of the joining means defining an air flow passage for establishing air communication between the air flow passage of the securing means and the diffusing material.

c. the receiving means of the conduit including a generally vertically extending riser pipe and the securing means including:

i. an elongate housing having an inner chamber therein, the chamber having an expandable air inlet opening at one end and a fixed air outlet opening at another end, the securing means air flow passage being defined through the chamber between the air inlet and outlet openings;

ii. an elastic membrane disposed across the chamber at the one end and having a central aperture therethrough defining the expandable air inlet opening; and iii. a substantially rigid membrane disposed across the chamber at the other end and having a central aperture therethrough defining the air outlet opening with an effective area greater than the minimum effective area of the air inlet opening.

11. The apparatus of claim 10, wherein the securing means further comprises an additional elastic membrane disposed across the chamber intermediate the ends thereof and having a central aperture therethrough with a minimum effective area less than the mean cross-sectional area of the riser pipe.

12. The diffuser of claim 10, wherein the substantially rigid membrane includes flow control means defined therewithin for constricting the area of the central opening through the rigid membrane to control the flow of air therethrough.

13. The diffuser of claim 10, wherein the riser pipe has an internal chamber communicating between an open lower end at the conduit and an open upper end, and flow control means defined in the internal chamber adjacent the open upper end and closing this end but for an opening defined through the flow control means, the opening having an effective area less than the cross-sectional area of the internal chamber.

* * * * *